United States Patent
Vouche et al.

(10) Patent No.: US 9,951,994 B2
(45) Date of Patent: Apr. 24, 2018

(54) MODULAR AIR COOLED CONDENSER APPARATUS AND METHOD

(71) Applicant: SPX DRY COOLING USA LLC, Overland Park, KS (US)

(72) Inventors: Michel Vouche, Brussels (BE); Christophe Deleplanque, Brussels (BE); Fabien Fauconnier, Le Roeulx (BE)

(73) Assignee: SPX DRY COOLING USA LLC, Overland Park, KS (US)

( * ) Notice: Subject to any disclaimer, the term of this patent is extended or adjusted under 35 U.S.C. 154(b) by 475 days.

(21) Appl. No.: 14/504,570

(22) Filed: Oct. 2, 2014

(65) Prior Publication Data

US 2015/0204611 A1    Jul. 23, 2015

Related U.S. Application Data

(63) Continuation of application No. 13/478,827, filed on May 23, 2012, now Pat. No. 9,551,532.

(51) Int. Cl.

| | |
|---|---|
| *F24H 3/00* | (2006.01) |
| *F28B 1/06* | (2006.01) |
| *B23P 15/26* | (2006.01) |
| *F28B 7/00* | (2006.01) |
| *F28B 9/02* | (2006.01) |

(52) U.S. Cl.
CPC ............... *F28B 1/06* (2013.01); *B23P 15/26* (2013.01); *F28B 7/00* (2013.01); *F28B 9/02* (2013.01); *Y10T 29/4935* (2015.01)

(58) Field of Classification Search
CPC ...... F28B 1/06; F28B 1/00; F28B 9/02; F28C 1/14; F28D 1/05308; F28D 5/00; B21D 53/02; F28F 9/007; F28F 9/013; F28F 2280/00–2280/105

USPC ........................................................... 165/47
See application file for complete search history.

(56) References Cited

U.S. PATENT DOCUMENTS

| | | |
|---|---|---|
| 3,384,165 A | 5/1968 | Mathews |
| 3,519,068 A | 7/1970 | Harris et al. |
| 3,685,579 A | 8/1972 | Spangemacher |
| 3,976,127 A | 8/1976 | Harris |
| 4,076,771 A | 2/1978 | Houx, Jr. et al. |
| 4,367,183 A | 1/1983 | Carbonaro |

(Continued)

FOREIGN PATENT DOCUMENTS

| | | |
|---|---|---|
| CN | 1185205 A | 6/1998 |
| CN | 101568790 A | 10/2009 |

(Continued)

OTHER PUBLICATIONS

International Search Report for International Application No. PCT/US2014/039718 dated Oct. 7, 2014.
Non-Final Office Action for U.S. Appl. No. 13/478,827 dated Apr. 10, 2015.
International Search Report for International Application No. PCT/US2014/039718, dated Oct. 7, 2014.

(Continued)

*Primary Examiner* — Travis Ruby
(74) *Attorney, Agent, or Firm* — Hanley, Flight and Zimmerman, LLC

(57) ABSTRACT

A mechanical draft cooling tower employs air cooled condenser modules and operates by mechanical draft to exchange heat between atmospheric air and steam. The cooling tower utilizes a modular air cooled condenser with heat exchange deltas having tube bundles that are manufactured and assembled prior to being shipped to the tower site.

13 Claims, 5 Drawing Sheets

(56) References Cited

U.S. PATENT DOCUMENTS

| | | | |
|---|---|---|---|
| 4,513,813 A | 4/1985 | Zanobini | |
| 4,913,710 A | 4/1990 | Reverdv | |
| 5,007,501 A | 4/1991 | Baston | |
| 5,098,006 A | 3/1992 | Mc Manus | |
| 5,301,746 A | 4/1994 | Trage et al. | |
| 5,851,446 A | 12/1998 | Bardo et al. | |
| 5,902,522 A | 5/1999 | Seawell et al. | |
| 5,966,809 A | 10/1999 | Pierce | |
| 7,610,949 B2 | 11/2009 | Palanchon | |
| 2008/0160902 A1 | 7/2008 | Desler | |
| 2009/0165993 A1 | 7/2009 | Yang et al. | |
| 2009/0211743 A1 | 8/2009 | Schrader et al. | |
| 2010/0044010 A1 | 2/2010 | Corser et al. | |
| 2010/0078147 A1 | 4/2010 | Samyn et al. | |
| 2010/0132917 A1* | 6/2010 | Runk | F28D 1/0443 165/67 |
| 2010/0147487 A1 | 6/2010 | Lewandowski et al. | |
| 2012/0023940 A1 | 2/2012 | Kitz et al. | |
| 2014/0150989 A1 | 6/2014 | Eindhoven | |

FOREIGN PATENT DOCUMENTS

| | | |
|---|---|---|
| CN | 101655322 A | 2/2010 |
| WO | 2010125017 A1 | 11/2010 |

OTHER PUBLICATIONS

First OA dated Nov. 23, 2015 for CN Patent Application No. 2013101959209 with English Translation.

\* cited by examiner

MODULAR AIR COOLED CONDENSER APPARATUS AND METHOD

CROSS-REFERENCE TO RELATED APPLICATIONS

This application claims priority and is a continuation of U.S. patent application entitled Modular Air Cooled Condenser Apparatus and Method, filed May 23, 2012, having a Ser. No. 13/478,827, the disclosure of which is hereby incorporated by reference in its entirety.

FIELD OF THE INVENTION

The present invention relates to a mechanical draft cooling tower that utilizes air cooled condenser modules. The aforementioned cooling tower operates by mechanical draft and achieves the exchange of heat between two fluids such as atmospheric air, ordinarily, and another fluid which is usually steam or some sort of industrial process fluid. The aforementioned cooling tower operates by mechanical draft which utilizes an air current generator such as a fan or the like.

BACKGROUND OF THE INVENTION

Cooling towers are heat exchangers of a type widely used to emanate low grade heat to the atmosphere and are typically utilized in electricity generation, air conditioning installations and the like. In a mechanical draft cooling tower for the aforementioned applications, airflow is induced or forced via an air flow generator such as a driven impeller, driven fan or the like. Cooling towers may be wet or dry. Dry cooling towers can be either "direct dry," in which steam is directly condensed by air passing over a heat exchange medium containing the steam or an "indirect dry" type cooling towers, in which the steam first passes through a surface condenser cooled by a fluid and this warmed fluid is sent to a cooling tower heat exchanger where the fluid remains isolated from the air, similar to an automobile radiator. Dry cooling has the advantage of no evaporative water losses. Both types of dry cooling towers dissipate heat by conduction and convection and both types are presently in use. Wet cooling towers provide direct air contact to a fluid being cooled. Wet cooling towers benefit from the latent heat of vaporization which provides for very efficient heat transfer but at the expense of evaporating a small percentage of the circulating fluid.

To accomplish the required direct dry cooling the condenser typically requires a large surface area to dissipate the thermal energy in the gas or steam and oftentimes may present several challenges to the design engineer. It sometimes can be difficult to efficiently and effectively direct the steam to all the inner surface areas of the condenser because of non-uniformity in the delivery of the steam due to system ducting pressure losses and velocity distribution. Therefore, uniform steam distribution is desirable in air cooled condensers and is critical for optimum performance. Another challenge or drawback is, while it is desirable to provide a large surface area, steam side pressure drop may be generated thus increasing turbine back pressure and consequently reducing efficiency of the power plant. Therefore it is desirous to have a condenser with a strategic layout of ducting and condenser surfaces that allows for an even distribution of steam throughout the condenser, that reduces back pressure, while permitting a maximum of cooling airflow throughout and across the condenser surfaces.

Another drawback to the current air cooled condenser towers is that they are typically very labor intensive in their assembly at the job site. The assembly of such towers oftentimes requires a dedicated labor force, investing a large amount of hours. Accordingly, such assembly is labor intensive requiring a large amount of time and therefore can be costly. Accordingly, it is desirable and more efficient to assemble as much of the tower structure at the manufacturing plant or facility, prior to shipping it to the installation site.

It is well known in the art that improving cooling tower performance (i.e. the ability to extract an increased quantity of waste heat in a given surface) can lead to improved overall efficiency of a steam plant's conversion of heat to electric power and/or to increases in power output in particular conditions. Moreover, cost-effective methods of manufacture and assembly also improve the overall efficiency of cooling towers in terms of cost-effectiveness of manufacture and operation. Accordingly, it is desirable for cooling tower that are efficient in both in the heat exchange properties and assembly. The present invention addresses this desire.

Therefore it would desirous to have an economical, mechanical draft, modular cooling tower that is efficient not only in its heat exchange properties but also in its time required for assembly and cost for doing the same.

SUMMARY OF THE INVENTION

Embodiments of the present invention advantageously provides for a fluid, usually steam and method for a modular mechanical draft cooling tower for condensing said steam.

An embodiment of the invention includes a method for assembling a modular air cooled condenser extending along a vertical axis away from horizontal, comprising the steps of: assembling a first condenser bundle assembly having a first set of tubes having first and second ends, a steam manifold connected to the first ends of the tubes, and a condensate header connected to the second ends of the tubes; assembling a second condenser bundle having a second set of tubes having first and second ends, a steam manifold connected to the first ends of the tubes, and a condensate header connected to the second ends of the tubes; placing the first and second condenser bundle assemblies in to a carrier; transporting the carrier to a location upon which the modular air cooled condenser will be assembled; assembling a heat exchange delta by placing the first condenser bundle and the second condenser bundle; and positioning the heat exchange delta on a modular tower frame.

Another embodiment of the present invention includes a modular air cooled condenser extending along a vertical axis away from horizontal, comprising: means for assembling a first condenser bundle assembly having a first set of tubes having first and second ends, a steam manifold connected to the first ends of the tubes, and a condensate header connected to the second ends of the tubes; means for assembling a second condenser bundle assembly having a second set of tubes having first and second ends, a steam manifold connected to the first end of the tubes, and a condensate header connected to the second ends of the tubes; means for placing the first and second condenser bundle assemblies in to a carrier; means for transporting the carrier to a location upon which the modular air cooled condenser will be assembled; means for assembling a heat exchange delta by placing using the first condenser bundle and the second condenser bundle; and means for positioning the heat exchange delta on a modular tower frame.

Another embodiment of the present invention, A mechanical draft modular air cooled condenser that cools an industrial fluid is disclosed, comprising: a plenum with which at least one delta resides wherein said at least one delta comprises first condenser bundle having a first set of tubes having first and second ends, a steam manifold connected to the first ends of the tubes, and a condensate header connected to the second ends of the tubes; and a second condenser bundle having a second set of tubes having first and second ends, a steam manifold connected to the first ends of the tubes, and a condensate header connected to the second ends of the tubes; a support frame that supports said plenum; and a shroud that houses an air current generator.

In yet another embodiment of the present invention, a method for assembling a modular air cooled condenser extending along a vertical axis is disclosed, comprising: assembling a first condenser bundle having a first set of tubes having first and second ends and a condensate header connected to the second end of the tubes; assembling a second condenser bundle having a second set of tubes having first and second ends, and a condensate header connected to the second end of the tubes; placing the first and second condenser bundles in to a carrier; transporting the carrier to a location upon which the modular air cooled condenser will be assembled; assembling a heat exchange delta by placing using the first condenser bundle and the second condenser bundle; and positioning the heat exchange delta on a modular tower frame.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Figure 1:
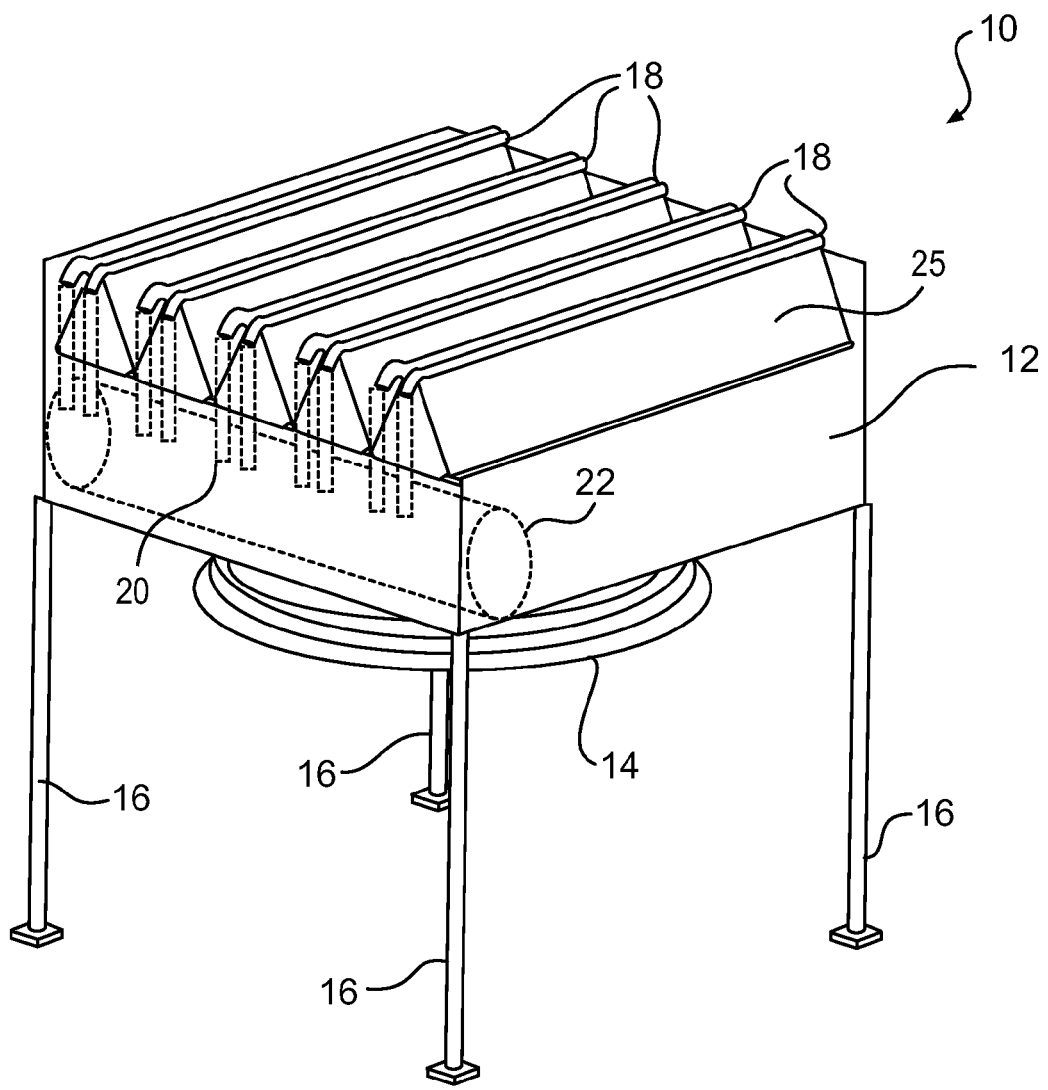
FIG. 1 is a perspective view of an air cooled condenser module in accordance with an embodiment of the present invention.

Turning now to FIG. 1, a modular air cooled condenser module, generally designated 10, is illustrated. The air cooled condenser module 10 generally includes a plenum 12, having an air current generator or fan disposed within a fan shroud or inlet bell 14 and a plurality of support columns or legs 16. The air cooled condenser module 10 further includes multiple A-type geometry deltas, each designated 18. Each delta 18 comprises two tube bundle assemblies 28 with a series of finned tubes to conduct heat transfer. The deltas 18 will be discussed in further detail below.

Figure 2:
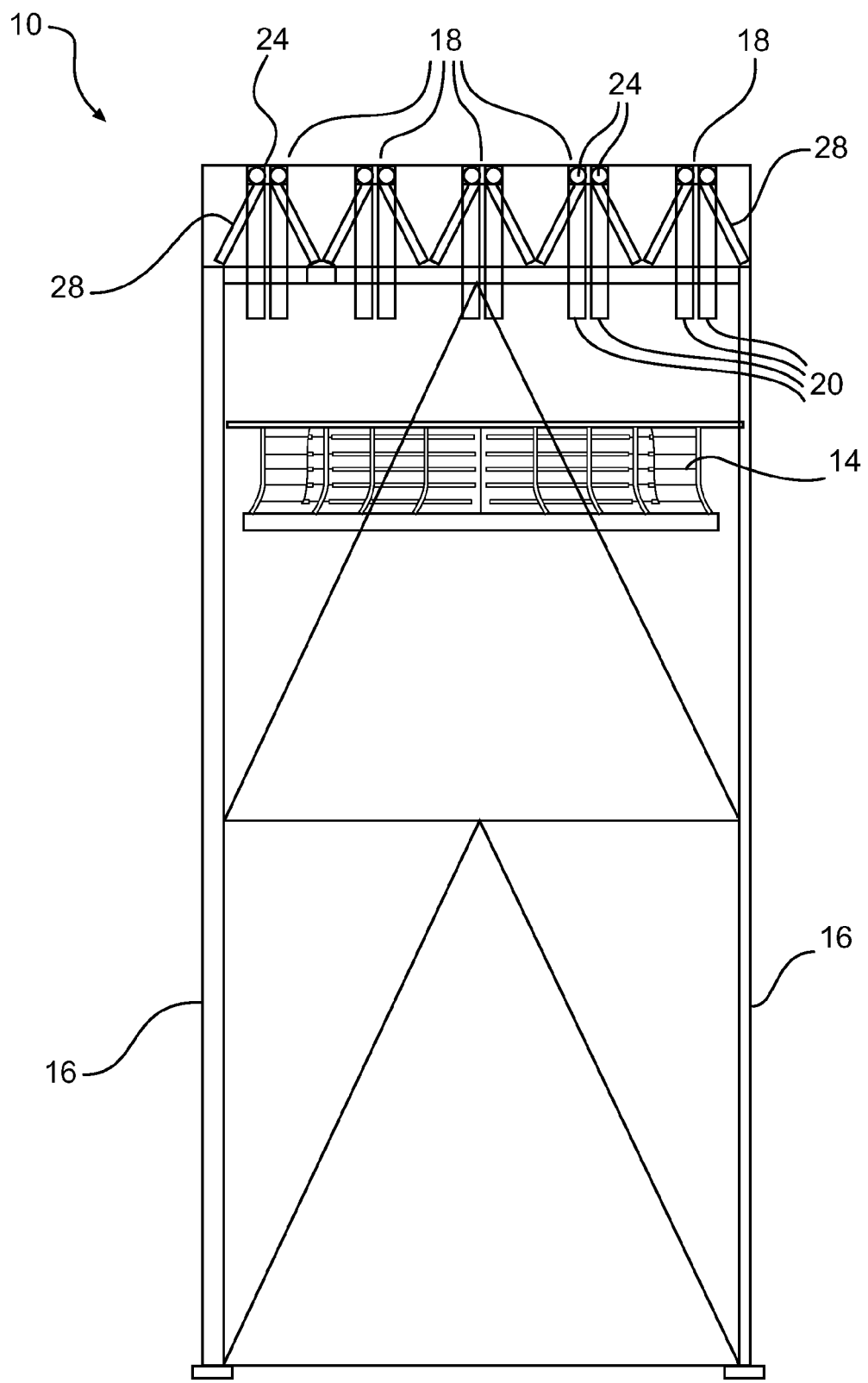
FIG. 2 is a schematic side view of the air cooled condenser module depicted in FIG. 1 in accordance with an embodiment of the present invention.
Figure 3:
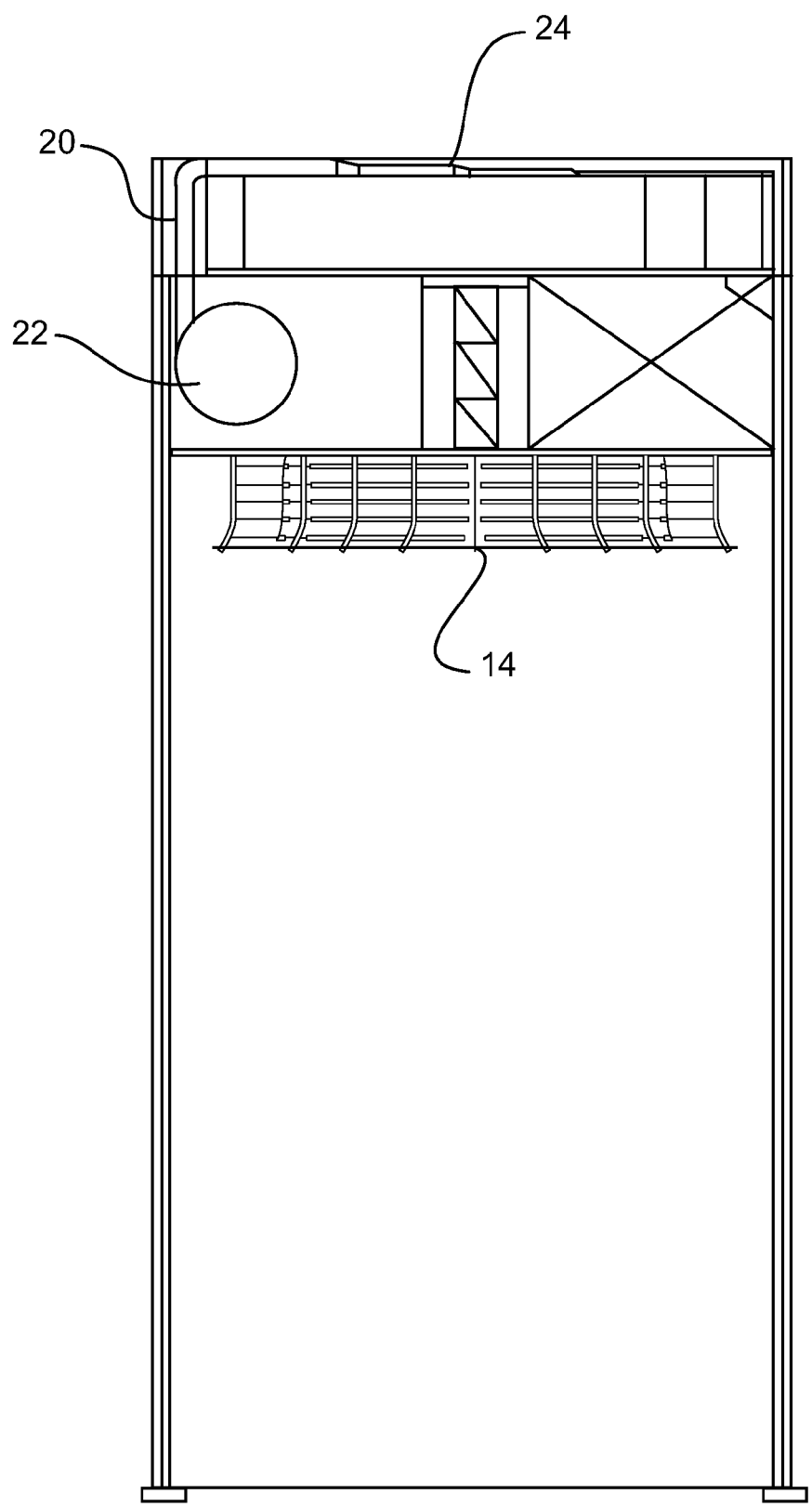
FIG. 3 is another schematic side view of the air cooled condenser module depicted in FIG. 1 in accordance with an embodiment of the present invention.

Turning now to FIGS. 2 and 3, schematic side views of the air cooled condenser 10 are depicted. As specifically illustrated in FIG. 2, the air cooled condenser employs risers 20 which are welded to the main steam duct 22. The risers 20 are connected to a steam manifold 24 which operates to keep the steam flow velocity more constant. This above described configuration is part the A-type condenser bundles 28 that are shipped as a unit from the factory, which will be discussed in further detail below. The condenser bundles 28 are preferably welded to the risers 20 via a transition piece 26 to accommodate the geometry of the steam manifold.

Figure 4:
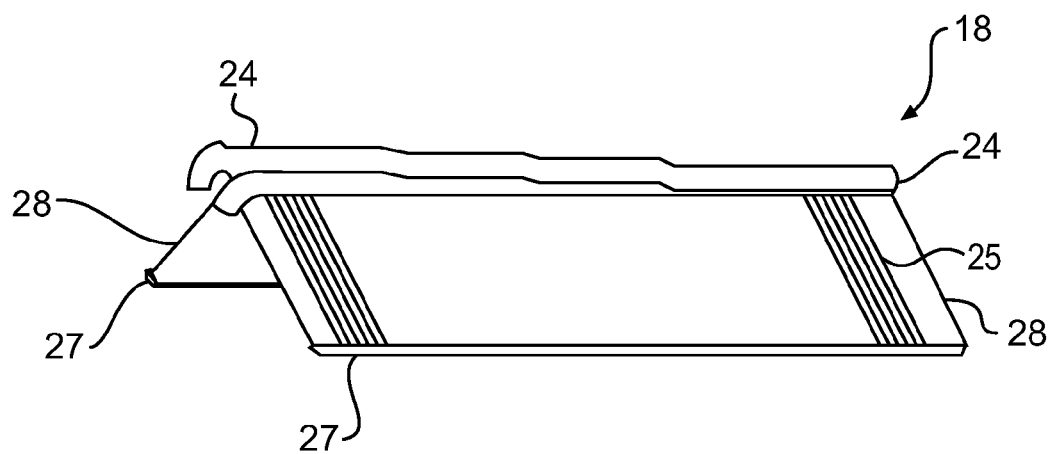
FIG. 4 is a perspective view of an A-type condenser configuration in accordance with an embodiment of the present invention.

Turning now to FIG. 4, a delta 18 is illustrated. As depicted, each delta 18 is comprised of two individual heat exchange bundle assemblies 28, each having a series of finned tubes. The individual tubes are approximately two (2) meters in length whereas the bundle length is approximately twelve (12) meters. As illustrated, each bundle assembly 28 is positioned at an angle to one another to form the A-type configuration of the delta 18. While the bundle assemblies 28 may be positioned at any desired angle, they preferably are positioned at an angle approximately twenty degrees (20°) to approximately thirty degrees (30°) from vertical and approximately sixty degrees (60°) to approximately seventy degrees (70°) from horizontal. More specifically, the bundle assemblies 28 are positioned at twenty-six degrees (26°) from vertical and sixty-four degrees (64°) from horizontal.

Each of the bundle assemblies 28 are assembled prior to shipping wherein each comprises a riser to header transition piece 26, steam manifold 24, finned tubes 25, and steam condensate headers 27. As can be seen in FIG. 1, due to the modular design and orientation of the bundle assemblies 28, the air cooled condenser design 10 has approximately five (5) times more tubes as compared to typical designs. Moreover, the embodiments of the current invention not only utilize five (5) times the tubes, but employ condenser tubes that are much shorter in length. As result of the aforementioned design and orientation, the steam velocity traveling through the tube bundles 28 is reduced as result of the increased number of tubes in combination with the reduced tube length, and therefore steam pressure drop within the deltas 18 is reduced, making the air cool condenser 10 more efficient.

Typically, turbine back pressure of an air cooled condenser or the like is limited by the maximum steam velocity in the tubes (to limit erosion) wherein the steam velocity is increasing with a decrease of back pressure (due to density of steam). Thus, due to the addition of tubes in accordance with the present invention, the steam is still maintained at the maximum allowable steam velocity but at a lower back pressure. The other limitation the current delta design addresses is that the pressure at the exit of the secondary bundles cannot be less than the vacuum group capability. This pressure typically results from turbine back pressure minus the pressure drop in ducting minus the pressure drop in the tubes. Accordingly, due to the reduced pressure drop in the tubes, the allowable turbine back pressure is lower with the delta 18 design.

Furthermore, the above-described bundle design also reduces the pressure drop within the individual delta 18. For example, the heat exchange that takes place via the deltas 18, is dependent upon the heat exchange coefficient, i.e., the mean temperature difference between air and steam and the exchange surface. Due to the reduced pressure drop as previously described, the mean pressure (average between inlet pressure and exit pressure) in the exchanger is higher with the design of the current condenser configuration 10. In other words, because steam is saturated, the mean steam temperature is also higher for the same heat exchange surface resulting in increased heat exchange.

Figure 5:
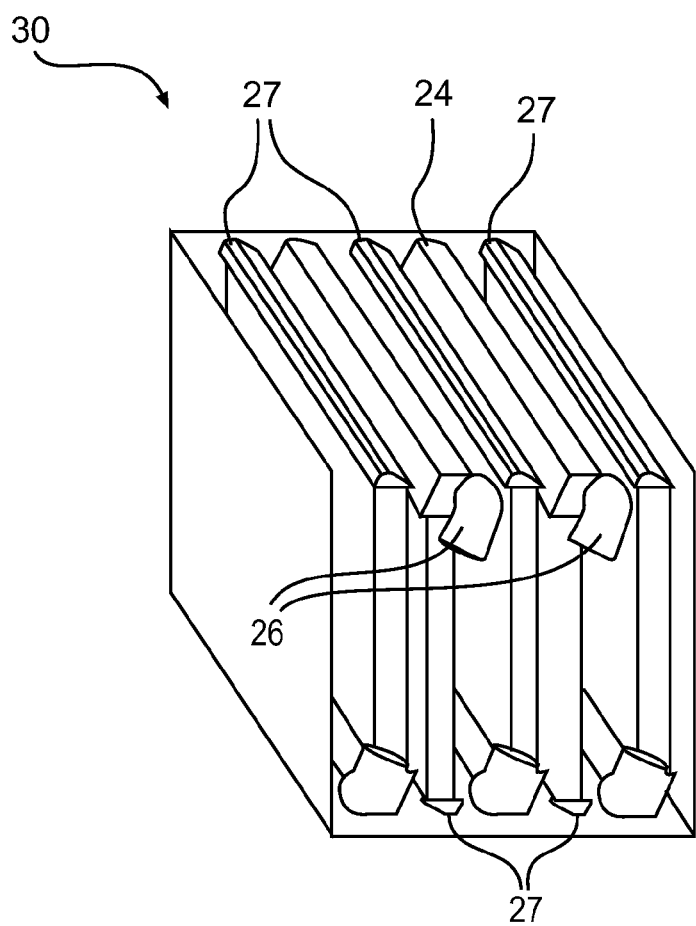
FIG. 5 illustrates the condenser bundles in a packaged arrangement for shipping in accordance with an embodiment of the present invention.

Turning now to FIG. 5, a transport carrier, generally designated 30 is illustrated. As the name suggests, the transport container or carrier 30 is used to transport the bundles 28, from the factory to the job site. As illustrated, the condenser bundles 28, are manufactured and assembled at the factory with the respective steam manifold 24 and steam condensate headers 27. While five (5) bundles are illustrated positioned in the transport container or carrier, more or less individual bundles may be shipped per carrier depending as needed or required.

Alternatively, the above described embodiments of the present employ tube bundles manufactured and assembled, prior to shipping, having steam manifold 24 and steam condensate headers 27, alternative embodiment bundles may not include a manifold prior to shipping. More specifically, in such embodiments, the tube bundles may be ship without steam manifolds 24 attached thereto. In said embodiments, the tube bundles 28 may be assembled in field to form the A-type configuration, as discussed above. However, instead of employing two steam manifolds, this alternative embodiment may employ a single steam manifold wherein the single steam manifold extends along the "apex" of the A configuration.

Figure 6:
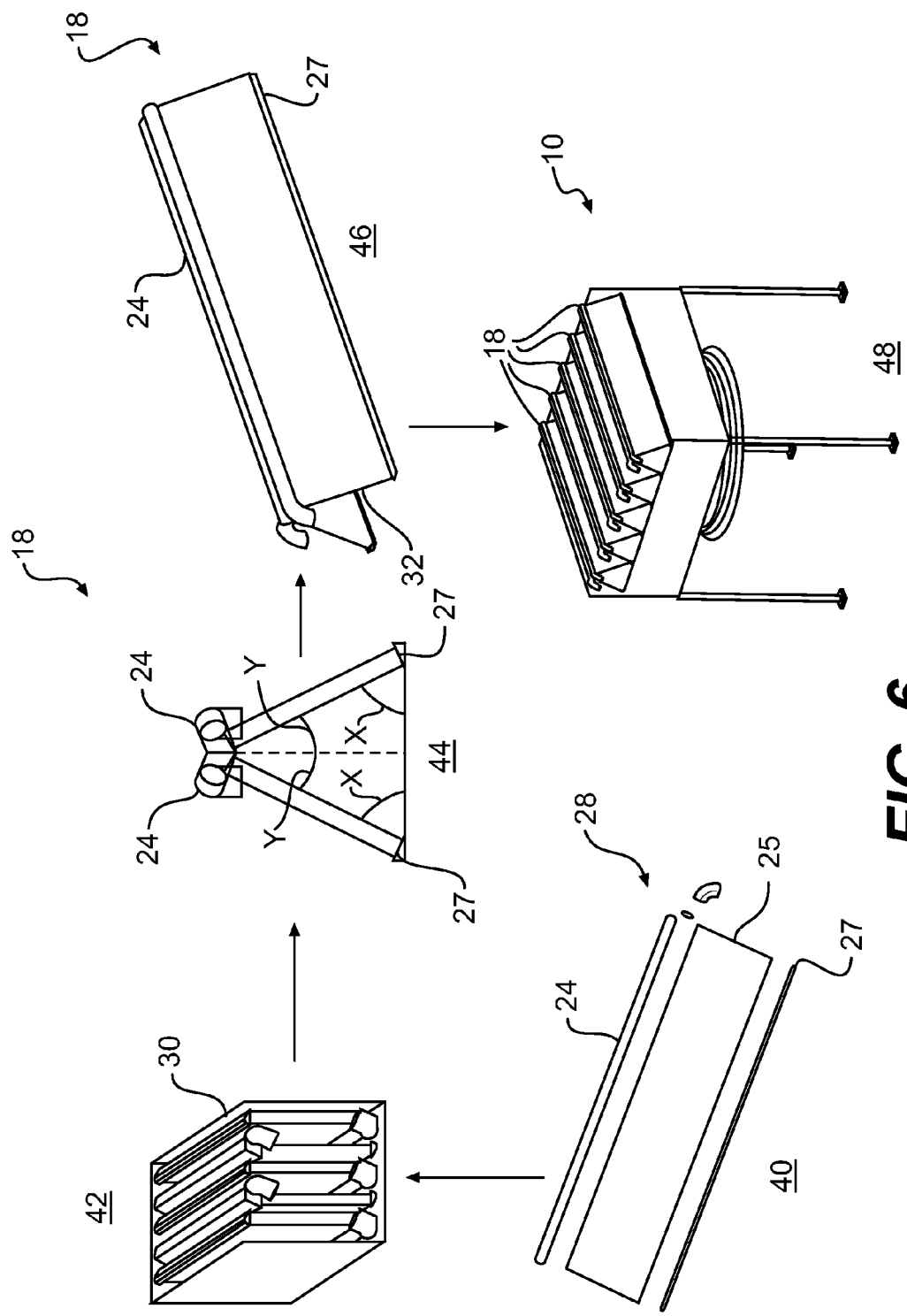
FIG. 6 schematically illustrates the steps of assembly of an air cooled condenser in accordance with an embodiment of the present invention.

Referring now to FIG. 6, a flow chart is illustrated, schematically depicting the steps of assembly of the air cooled condenser tower 10. As previously described, the individual tube bundles 28 are assembled prior to shipment to the job site, as referenced by numeral 40. Each individual bundle assembly 28 includes a plurality of finned tubes 25 along with a steam manifold 24 and steam condensate header 27. As previously discussed in connection with the previous figures of the specification, the bundle assemblies 28 are pre-manufactured at the factory prior to placing the individual bundle assemblies 28 in the shipping carrier 30 as identified by numeral 42. The shipping carriers 30 are then shipped to the erection field site.

Next, the delta, generally indicated as 18, is assembled in the field as identified by numerals 44 and 46. As previously described, while the bundles may be positioned at any desired angle, they preferably are positioned at an angle (y) approximately twenty degrees (20°) to approximately thirty degrees (30°) from vertical and an angle (x) approximately sixty degrees) (60°) to approximately seventy degrees (70°) from horizontal. More specifically, the bundles are positioned at twenty-six degrees (26°) from vertical and sixty-four degrees (64°) from horizontal. As designated by numeral 46, a single A-type delta is illustrated 18 formed by two bundle assemblies 28 to form the "A" configuration. The bundle assemblies 28 self support one another in this configuration.

Turning now to the air cooled condenser module 10 as referenced by the numeral 48, it is depicted employing five deltas 18. As discussed above, the air cooled condenser is an improvement over current air cooled condenser types and it has a high "pre-fabrication" level which equates to reduced installation cost and reduced installation time. Moreover, the above-described design reduces the pressure drop, thereby providing a more efficient heat exchange apparatus.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example a forced draft air cooled condenser has been illustrated but an induced draft design can be adapted to gain the same benefits and, accordingly, all suitable modifications and equivalents may be resorted to that fall within the scope of the invention.

What is claimed is:

1. A method for assembling a modular air cooled condenser extending along a vertical axis away from horizontal, the method comprising:

assembling a first condenser bundle having a first set of tubes having first and second ends, and a condensate header connected to the second ends of the first set of tubes;

assembling a second condenser bundle having a second set of tubes having first and second ends, and a condensate header connected to the second ends of the second set of tubes;

placing the first and second condenser bundles into a carrier; and then:

transporting the carrier to a location upon which the modular air cooled condenser will be assembled;

assembling a heat exchange delta using the first condenser bundle and the second condenser bundle; and attaching a steam manifold to the first ends of the first sets of tubes and the first ends of the second sets of tubes at the location, wherein the steam manifold provides steam to the first condenser bundle and the second condenser bundle.

2. The method according to claim 1, further comprising positioning the heat exchange delta on a modular tower frame.

3. The method according to claim 1, wherein the step of assembling the heat exchange bundle comprises placing the first condenser bundle at an angle to vertical and horizontal and placing the second condenser bundle at an angle to vertical and to horizontal wherein the first and second heat exchange bundles contact one another at a point to form an "A" type configuration.

4. The method according to claim 3, wherein each of the first and second heat exchange bundles is positioned at an angle to horizontal equal to approximately sixty degrees to approximately seventy degrees and wherein each of the first and second heat exchange bundles is positioned at an angle to vertical equal to approximately twenty degrees to approximately thirty degrees.

5. The method according to claim 4, wherein each of the first and second heat exchange bundles is positioned at an angle to horizontal equal to approximately sixty-four degrees and wherein each of the first and second heat exchange bundles are positioned at an angle to vertical equal to approximately twenty-six degrees.

6. The method according to claim 1, wherein each of the first and second set of tubes have fins attached thereto.

7. The method according to claim 1, wherein said set of tubes comprises tubes having a length equal to approximately two meters.

8. The method according to claim 7, wherein each of said first and second condenser bundles has a length equal to approximately twelve meters.

9. The method according to claim 1, further comprising the steps of:

assembling a third condenser bundle having a third set of tubes having first and second ends, and a condensate header connected to the second ends of the third set of tubes;

assembling a fourth condenser bundle having a fourth set of tubes having first and second ends, and a condensate header connected to the second ends of the fourth set of tubes; and placing the third and fourth condenser bundles into the carrier.

10. The method according to claim 9, further comprising attaching a steam manifold to the first ends of the third sets of tube and the first ends of the fourth sets of tubes at the location, wherein the steam manifold provides steam to the third condenser bundle and the fourth condenser bundle.

11. The method according to claim 10, further comprising:

assembling a second heat exchange delta by placing using the third condenser bundle and the fourth condenser bundle; and positioning the second heat exchange delta on the modular tower frame.

12. The method according to claim 2, wherein the modular tower frame comprises:

a plenum within which the delta resides;

at least two columns that support the plenum; and a shroud that houses an air current generator.

13. The method according to claim 12, wherein the delta is five deltas and the air current generator is a fan.

* * * * *